US011906245B2

(12) United States Patent
Uribe Arancibia et al.

(10) Patent No.: US 11,906,245 B2
(45) Date of Patent: Feb. 20, 2024

(54) SYSTEM FOR REHEATING AIR IN DRYERS

(71) Applicants: CMPC Tissue S.A., Santiago (CL); Andritz Ltd., Montreal (CA)

(72) Inventors: Reinaldo Augusto Uribe Arancibia, Santiago (CL); George Z. Nowakowski, Montreal (CA)

(73) Assignees: CMPC TISSUE S.A., Santiago (CL); ANDRITZ LTD., Montreal (CA)

( * ) Notice: Subject to any disclaimer, the term of this patent is extended or adjusted under 35 U.S.C. 154(b) by 0 days.

(21) Appl. No.: 18/136,286

(22) Filed: Apr. 18, 2023

(65) Prior Publication Data

US 2023/0251034 A1 Aug. 10, 2023

Related U.S. Application Data

(63) Continuation of application No. 17/223,242, filed on Apr. 6, 2021, now Pat. No. 11,662,142.

(51) Int. Cl.
*F26B 21/02* (2006.01)
*B01F 35/21* (2022.01)
(Continued)

(52) U.S. Cl.
CPC ............ *F26B 21/02* (2013.01); *B01F 23/191* (2022.01); *B01F 35/2113* (2022.01);
(Continued)

(58) Field of Classification Search
CPC .. F26B 21/02; F26B 3/04; F26B 20/00; B01F 23/191; B01F 35/2113; B01F 35/2115; D21F 5/20
(Continued)

(56) References Cited

U.S. PATENT DOCUMENTS 4,294,403 A * 10/1981 Ammons ................ F24F 3/048 165/263
4,560,103 A * 12/1985 Schulz ............... B60H 1/00664 236/13

(Continued)

FOREIGN PATENT DOCUMENTS

CN 211057507 U 7/2020
DE 29809208 U1 10/1998

(Continued)

OTHER PUBLICATIONS

U.S. Appl. No. 17/223,242, Notice of Allowance, dated Feb. 8, 2023.

(Continued)

*Primary Examiner* — John P McCormack
(74) *Attorney, Agent, or Firm* — Kilpatrick Townsend & Stockton, LLP

(57) ABSTRACT

An exemplary process air recirculation system, and an electric heater mixing apparatus is disclosed herein. Exemplary process air recirculation systems comprise the electric heating mixing apparatus. An exemplary electric heating mixing apparatus comprises: walls defining a first chamber having a first upstream opening and a first downstream opening, and a second chamber having a first upstream opening and a first downstream opening, wherein the second chamber is adjacently disposed to the first chamber, a first inlet damper disposed at the first upstream opening, a second inlet damper disposed at the second upstream opening, and a resistance-type electric air heater disposed in the first chamber.

19 Claims, 3 Drawing Sheets

(51) Int. Cl.
*B01F 23/10* (2022.01)
*F26B 3/04* (2006.01)
*F26B 20/00* (2006.01)

(52) U.S. Cl.
CPC ............ *B01F 35/2115* (2022.01); *F26B 3/04* (2013.01); *F26B 20/00* (2013.01)

(58) Field of Classification Search
USPC ......... 34/535; 220/367.1, 373, 202; 110/190
See application file for complete search history.

(56) References Cited

U.S. PATENT DOCUMENTS

| | | | | |
|---|---|---|---|---|
| 5,784,804 | A * | 7/1998 | Nowakowski ............ | D21F 5/20 34/446 |
| 5,931,227 | A * | 8/1999 | Graves ..................... | F24F 11/46 165/216 |
| 6,079,115 | A | 6/2000 | Nowakowski et al. | |
| 6,085,443 | A | 7/2000 | Hunter et al. | |
| 10,739,072 | B2 | 8/2020 | Violette et al. | |
| 2005/0028970 | A1* | 2/2005 | Sekhar .................. | F24F 3/0442 165/205 |
| 2008/0034606 | A1* | 2/2008 | Deem ..................... | D21F 5/044 34/115 |
| 2016/0003541 | A1 | 1/2016 | Plavnik et al. | |
| 2022/0042244 | A1 | 2/2022 | Saikkonen et al. | |
| 2023/0105523 | A1* | 4/2023 | Rogers .................... | H04L 67/12 29/592.1 |

FOREIGN PATENT DOCUMENTS

| | | | |
|---|---|---|---|
| EP | 0891440 | B1 | 12/2001 |
| WO | 2020148304 | A1 | 7/2020 |

OTHER PUBLICATIONS

U.S. Appl. No. 17/223,242, Final Rejection, dated Dec. 20, 2022.

U.S. Appl. No. 17/223,242, Non-Final Rejection, dated Oct. 27, 2022.

International Patent Application No. PCT/IB2022/053049, International Search Report and Written Opinion, dated Jun. 13, 2022.

"International Preliminary Report on Patentability", issued by the International Bureau for PCT/IB2022/053049 dated Oct. 19, 2023, 9 pages.

* cited by examiner

SYSTEM FOR REHEATING AIR IN DRYERS

CROSS REFERENCE TO RELATED APPLICATION

This application is a continuation of and claims priority benefits from U.S. patent application Ser. No. 17/223,242, filed on Apr. 6, 2021, entitled SYSTEM FOR REHEATING AIR IN DRYERS, which is hereby incorporated in its entirety by this reference.

BACKGROUND OF THE INVENTION

1. Technical Field

The present invention is generally related to the field of industrial pulp, paper, tissue, non-woven fabrics, and card stock drying, and more particularly is related to apparatuses, systems, and methods configured to dry lignocellulosic material while lowering greenhouse gas emissions.

2. Related Art

Drying systems are used extensively in the manufacture of paper, tissue, non-woven fabrics, and corrugated board. Examples of such drying systems include through air drying ("TAD") systems, Yankee hood drying systems, and pulp dryer systems. Yankee hood drying systems are primarily used in the manufacture of tissue paper, whereas TAD systems are used commonly in tissue, card stock, and non-woven fabric production, and pulp dryers are used primarily with the drying and bailing of lignocellulosic pulp.

Although drying systems differ slightly, most drying systems utilize a process air recirculation system. These systems recapture process air that is used to dry the pulp, paper, tissue, card stock, non-woven web, etc. and reheat said air to desired temperatures. These systems then re-introduce the reheated air into the dryer to continue the drying process. Without process air recirculation systems, many pulp and web drying processes could not run economically.

Process air recirculation systems typically have a combustion air heater, circulating fans, accompanying motors, and interconnecting ducts.

Significant capital investment is required to design and assemble the dryer and its associated process air recirculation systems. For example, in a typical tissue, paper, or card stock machine, the process air recirculation system comprises about 60% of the cost of the entire drying system. In addition, over 50% of the overall energy consumed by the machine is consumed by the dryer and process air recirculation system. Nearly all process air recirculation systems use combustion burners to re-heat the process air. These combustion burners are powered by fossil fuels, commonly natural gas, or petroleum-derived fuels.

The amount of greenhouse gases (e.g., carbon dioxide, methane, carbon monoxide etc.) emitted into the atmosphere is directly proportional to the amount of fossil fuels used to power the combustion burners. The dryer system and the process air recirculation system therefore are responsible for over half of the greenhouse gas emissions attributable to the tissue machine.

Conventional dryers and process air recirculation systems also suffer from delayed temperature regulation. The combustion burner is located upstream of the tissue web. Adjustments to fuel input and therefore, adjustments to combustion burner output and temperature are generally only made after measuring physical qualities of the tissue web after sections of the tissue web passes through the dryer. With a Yankee hood for example, the hood itself impinges hot air flow on the web tissue sheet with temperatures reaching 950 degrees Fahrenheit ("° F.") (about 510 degrees Celsius ("° C.")) and air impingement jet velocities of up to 40,000 feet per minute ("fpm"). The drying process occurs in a fraction of a second. A typical tissue machine dries a web at a rate of about 6,600 fpm. By the time the dried tissue is scanned downstream of the Yankee hood, the dried tissue's physical properties are evaluated, the fuel input to the combustion burner is adjusted, and the new temperature of the drying air diffuses to the section of the web entering the Yankee hood, tens of thousands of feet of tissue web will have passed through the Yankee hood at sub-optimal temperatures. Furthermore, natural variations in the physical properties of the incoming tissue web could obviate the efficacy of the prior adjustments. If temperatures and fuel input are adjusted to optimize drying for these new characteristics after the web has already undergone drying at a rate of 6,600 fpm, the delayed temperature regulation problem compounds and persists. This can potentially lead to tens of thousands of feet of tissue product manufactured at undesirable grades. This measurement and process delay similarly leads to imprecise control of energy consumption in conventional systems.

Previous attempts to reduce the amount of greenhouse gas emissions from a Yankee hood drying system were contemplated in Chinese utility model CN 211057507 U. However, the disclosed design did not permit optimal use of a combustion burner in the event of a shortage of burner fuel. The disclosed design also did not contemplate the problems of delayed temperature regulation and imprecise energy consumption. Additionally, maintenance of the system disclosed in CN 211057507 U required the complete deactivation of the entire process air recirculation system and dryer. This resulted in production loss and increased energy demands upon startup.

SUMMARY OF THE INVENTION

The problems of greenhouse gas emissions, delayed temperature regulation, and imprecise energy consumption control in dryers used in tissue, paper, and corrugated board forming machines, is mitigated by exemplary embodiments in accordance with the present disclosure. One such embodiment comprises a system including: a dryer, an exhaust outlet disposed downstream from the dryer, a makeup air inlet disposed downstream from the dryer, wherein the dryer is configured to fluidly communicate with both the exhaust outlet and the makeup air inlet, an electric heater mixing plenum configured to fluidly communicate with the air makeup inlet, wherein the electric heater mixing plenum is disposed downstream of the makeup inlet, a combustion heating system configured to fluidly communicate with the electric heater mixing plenum, wherein the gas combustion heating system is disposed downstream of the electric heater mixing plenum, and wherein the combustion heating system is disposed upstream of the dryer, thereby completing a circuit.

Another exemplary embodiment of a process air recirculation system comprises: a dryer, an electric heater mixing plenum having: an upstream end configured to fluidly communicate with a process air outlet conduit, wherein the process air outlet conduit is configured to fluidly communicate with a dryer, a downstream end configured to fluidly communicate with a reheated air inlet conduit, wherein the reheated air inlet conduit is configured to fluidly communicate with the dryer, wherein the electric heater mixing plenum comprises: walls defining a first chamber having a first upstream opening and a first downstream opening, and a second chamber having a second upstream opening and a second downstream opening, wherein the second chamber is adjacently disposed to the first chamber, a first inlet damper disposed at the first upstream opening, a second inlet damper disposed at the second upstream opening, and a resistance-type electric air heater disposed in the first chamber.

It is contemplated that embodiments in accordance with the present disclosure may yield certain advantages. For example, in a case of high-power electricity failure, the second ("bypass") chamber in the electric heater mixing plenum can permit the cool process air entering the electric heater mixing plenum to circumvent the malfunctioning electric heating element, thereby allowing the combustion heating system to take over the full load of drying and then recirculating the desirably reheated process air into the dryer.

It is further contemplated that exemplary electric heater mixing plenums in accordance with this disclosure are configured to be low-air resistance plenums. Without being bound by theory, it is believed that forcing process air through a heater without a plenum would increase the air pressure drop by about 15% on the blower, thereby encouraging greater energy expenditures in the blower to make up for this pressure drop.

It is further contemplated that in the case of failure of an electric heating element, maintenance personnel could enter the first chamber of the electric heater mixing plenum to repair or replace the malfunctioning electric heater while permitting cool process air to flow through the bypass chamber of the electric heater mixing plenum thereby keeping the process air reheating and recirculation system operational during maintenance and avoiding production loss.

It is further contemplated that the electric heater mixing plenum gives the operators additional way to control energy consumption of both electric and gas heaters that work in series. For example, such a system could evaluate or display the cost of a unit of fossil burner fuel and a unit of electrical energy. Equipment operators or algorithms may then choose to run the system at the lowest cost. In other exemplary embodiments, the system may be run with a mixture of electrical energy and fossil burner fuel. Comparing the electrical energy unit cost and the burner fuel unit cost may indicate to the equipment operators the most cost-effective drying energy usage. Renewable energy sources (e.g., solar, wind, hydrogen) used to generate electricity at attractive unit cost may provide the plant with the optimum energy cost usage.

It is still further contemplated that exemplary systems disclosed herein may permit operators to obtain performance curves depicting the progressive control of heat output.

It is further contemplated that the exemplary electric heater mixing plenums disclosed herein may be used to retrofit existing systems, thereby permitting mill operators to forego complete replacement of their existing systems.

These features, and other features and advantages of the present invention will become more apparent to those of ordinary skill in the art when the following detailed description of the preferred embodiments is read in conjunction with the appended figures.

BRIEF DESCRIPTION OF THE DRAWINGS

The foregoing will be apparent from the following more particular description of exemplary embodiments of the disclosure, as illustrated in the accompanying drawings. The drawings are not necessarily to scale, with emphasis instead being placed upon illustrating the disclosed embodiments.

DETAILED DESCRIPTION OF THE PREFERRED EMBODIMENTS

Figure 1:
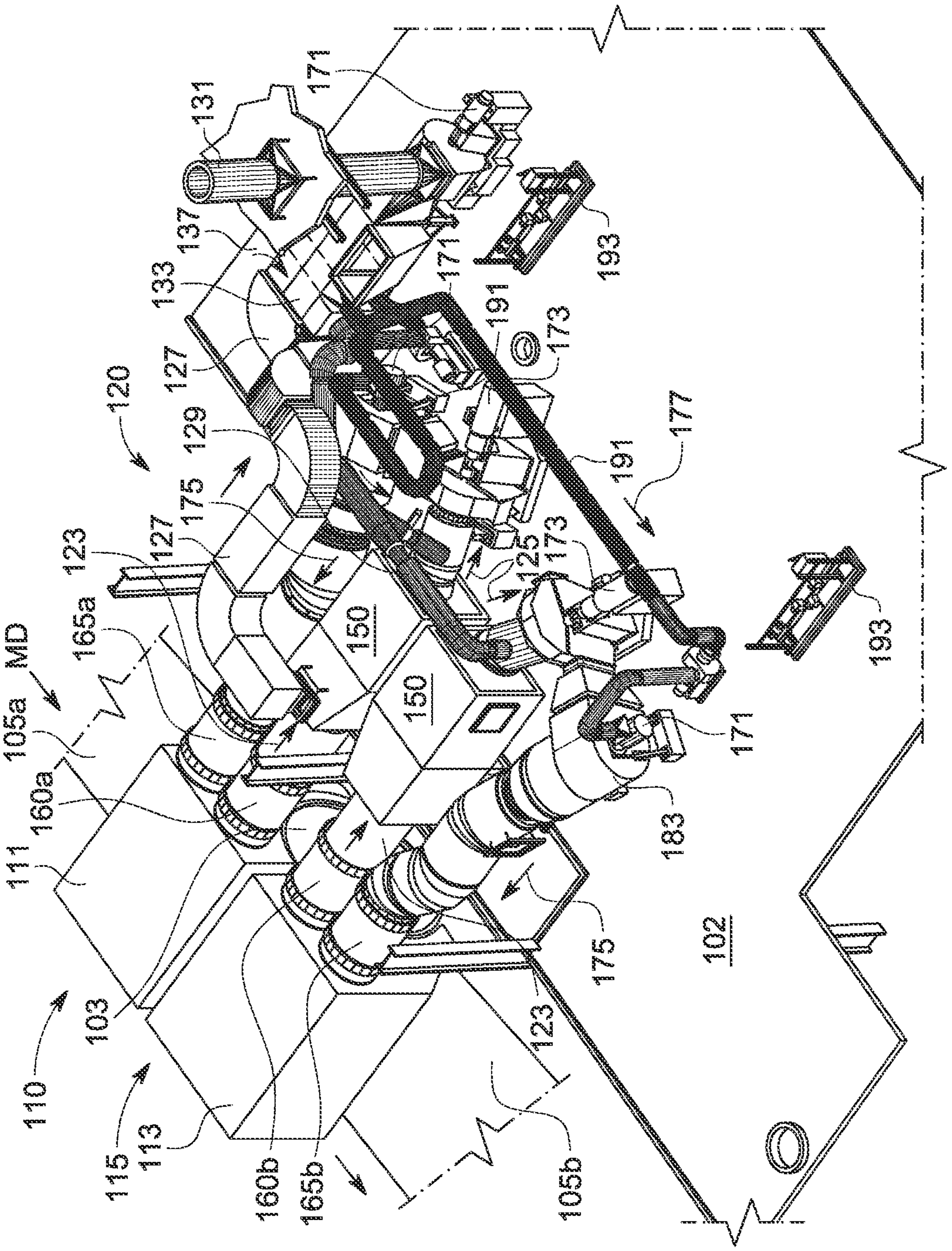
FIG. 1 is a perspective view of a Yankee hood drier system having an exemplary resistance-type electric process air heating and recirculation system comprising an electric heater mixing plenum.

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Similar reference characters indicate corresponding parts throughout the several views unless otherwise stated. Although the drawings represent embodiments of various features and components according to the present disclosure, the drawings are not necessarily to scale and certain features may be exaggerated to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as such circumstances require; (b) the singular terms "a," "an," and "the," as used in the specification and the appended claims include plural references unless the context clearly dictates otherwise; (c) the antecedent term "about" applied to a recited range or value denotes an approximation with the deviation in the range or values known or expected in the art from the measurements; (d) the words, "herein," "hereby," "hereto," "hereinbefore," and "hereinafter," and words of similar import, refer to this specification in its entirety and not to any particular paragraph, claim, or other subdivision, unless otherwise specified; (e) descriptive headings are for convenience only and shall not control or affect the meaning of construction of part of the specification; and (f) "or" and "any" are not exclusive and "include" and "including" are not limiting. Further, the terms, "comprising," "having," "including," and "containing" are to be construed as open-ended terms (i.e., meaning "including but not limited to").

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether explicitly described.

To the extent necessary to provide descriptive support, the subject matte and/or text of the appended claims are incorporated herein by reference in their entirety.

Recitation of ranges of values herein are merely intended to serve as a shorthand method of referring individually to each separate value falling within the range of any subranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range of sub range thereof, is included herein unless the context clearly dictates otherwise. All subranges are also included. The upper and lower limits of these smaller ranges are also included therein, subject to any specifically and expressly excluded limit in the stated range.

It should be noted that some of the terms used herein are relative terms. For example, the terms, "upper" and, "lower" are relative to each other in location, i.e., an upper component is located at a higher elevation than a lower component in each orientation, but these terms can change if the orientation is flipped. The terms, "inlet" and "outlet" are relative to the fluid flowing through them with respect to a given structure, e.g., a fluid flows through the inlet into the structure and then flows through the outlet out of the structure. The terms, "upstream" and "downstream" are relative to the direction in which a fluid flows through various components prior to flowing through the downstream component.

The terms, "horizontal" and "vertical" are used to indicate direction relative to an absolute reference, i.e., ground level. However, these terms should not be construed to require structure to be absolutely parallel or absolutely perpendicular to each other. For example, a first vertical structure and a second vertical structure are not necessarily parallel to each other. The terms, "top" and "bottom" or "base" are used to refer to locations or surfaces where the top is always higher than the bottom or base relative to an absolute reference, i.e., the surface of the Earth. The terms, "upwards" and "downwards" are also relative to an absolute reference; an upwards flow is always against the gravity of the Earth.

It will be understood that the drying systems referred to in this disclosure can include Yankee hood dryer systems, crescent former tissue machines, TAD systems, and pulp drying systems. For the sake of simplicity, the dryer system 110 depicted in in FIG. 1 is a Yankee hood dryer system. Likewise, the dryer 115 is a Yankee hood dryer. A Yankee hood dryer system is an integral part of nearly every tissue machine. The Yankee hood dryer 115 comprises a wet end 111 adjacent to a dry end 113. The wet end 111 and dry end 113 are independently mounted on gimbles and can be positioned independently of each other to adjust the size of the gap between the bottom of the wet end 111 and dry end 113 respectively and the surface of the Yankee drum 103. The size of the gap varies depending upon the operation and properties of the web, but a gap size of about one inch is common.

A wet web 105*a* of tissue moves in the machine direction MD toward the wet end 111 of the Yankee hood dryer 115. The wet web 105*a* impinges the surface of the Yankee drum 103. The inside of the Yankee drum comprises a series of pipes and collection reservoirs into which steam is constantly pumped and condensate collected. In this manner, the rotating Yankee drum 103 is heated to the desired temperature. In some processes, this temperature can reach 950° F. (510° C.). Hot air capable of reaching the same temperature is also ejected from the bottom of the wet end 111 of the Yankee hood 115 through impingement jets. The impingement jets can eject the hot process air at velocities of up to 40,000 fpm. The drying process occurs in a fraction of a second. The dry web 105*b* continues to rotate with the Yankee drum though the gap defined by the dry end 113 of the Yankee hood and the Yankee drum 103. A doctor blade then shears the dry web 105*b* from the Yankee drum 103 and the dry web 105*b* continues to move rapidly in the machine direction MD for further processing. A typical tissue machine dries a web at a rate of about 6,600 fpm.

It will be understood that the web 105 depicted in FIG. 1 is a tissue web and that the web 105 can be representative of non-woven fabric webs for non-woven drying systems, a card stock web for card stock drying systems, a paper web for paper drying systems, and a conveyance of pulp for pulp drying systems.

In FIG. 1, an exemplary process air recirculation system 120 can be seen fluidly communicating with the wet end 111 and dry end 113 of the Yankee hood 115, respectively. The air recirculation system 120 is primarily disposed on the mezzanine floor 102 adjacent to the drying system 110.

The exemplary process air recirculation system 120 includes and electric heater mixing plenum 150. The depicted embodiment illustrates two electric heater mixing plenums 150, one for the wet end 111 and one for the dry end 113 electric heater mixing plenum 150, but it will be understood that other exemplary process air recirculation systems 120 can comprise one electric heater mixing plenum 150, or more than two electric heater mixing plenums 150.

Figure 2:
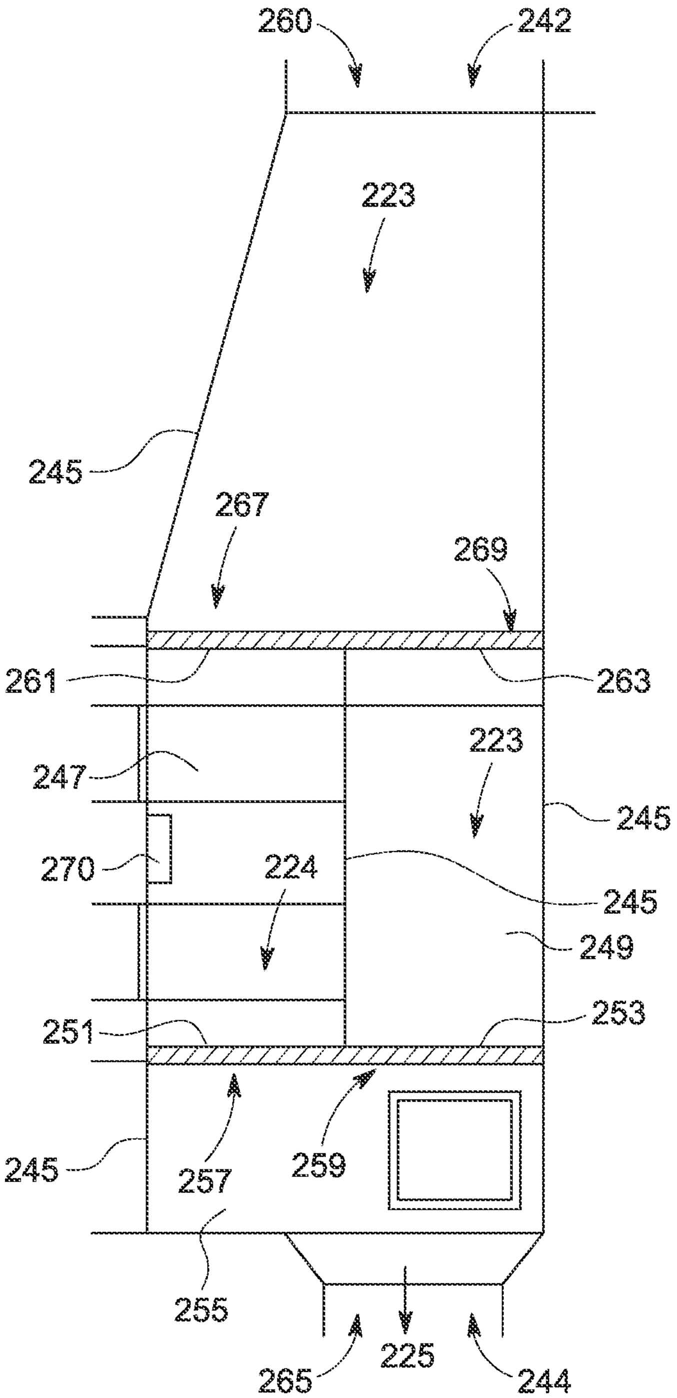
FIG. 2 is a top-down cross-sectional view of the exemplary electric heater mixing plenum shown in FIG. 1.

FIG. 2 is a close-up cross-sectional top-down view of the exemplary electric heater mixing plenum 150 250 depicted in FIG. 1. Referring to FIGS. 1 and 2, an exemplary electric heater mixing plenum 150, 250 comprises: an upstream end 242 configured to fluidly communicate with a process air outlet conduit 160, 260.

Although FIG. 1 depicts a process air outlet conduit 160*a* engaged to the wet end 111 of the dryer 115 and another process air outlet conduit 160*b* engaged to the dry end 113 of the dryer 115, it will be understood that certain exemplary embodiments may comprise a single process air outlet conduit 160 or more than two process air outlet conduits 160. The process air outlet conduit 160 is configured to fluidly communicate with the dryer 115. The phrase, "fluidly communicate" means that one or more enclosed intermediaries (such as a duct, pipe, tube, or other conduit) has one end connected to a first upstream antecedent (e.g. a dryer) and another end connected to a distal downstream antecedent (e.g. an electric heater mixing plenum) such that a fluid (i.e. a gas, liquid, or a mixture of a gas, liquid, or particles within a gas or liquid; e.g. the process air) can move within the enclosed intermediary or intermediaries from the upstream antecedent to the downstream antecedent. In many practical applications, ductwork or piping that is fastened or otherwise engaged to the antecedents, connects the antecedents, and permits the process air to flow from an upstream origin to a downstream destination. In this manner, the recited elements are configured to fluidly communicate.

The exemplary electric heater mixing plenum 150, 250 further comprises a downstream end 244 configured to fluidly communicate with a reheated air inlet conduit 165. The reheated air inlet conduit 165 is configured to fluidly communicate with the dryer 115. Although FIG. 1 depicts a reheated air inlet conduit 165*a* engaged to the wet end 111 of the dryer 115 and another reheated air inlet conduit 165*b* engaged to the dry end 113 of the dryer 115, it will be understood that certain exemplary embodiments may comprise a single reheated air inlet conduit 165 or more than two reheated air inlet conduits 165.

The electric heater mixing plenum 150, 250 comprises: walls 245 defining a first chamber 247 having a first upstream opening 267 and a first downstream opening 257, and a second chamber 249 having a first upstream opening 269 and a first downstream opening 259. The second chamber 249 is adjacently disposed to the first chamber 247. A first inlet damper 261 is disposed at the first upstream opening 267. A second inlet damper 263 is disposed at the second upstream opening 269. A resistance-type electric air heater 270 is disposed in the first chamber 247. A first outlet damper 251 is disposed at the first downstream opening 257. A second outlet damper 253 is disposed at the second downstream opening 259. In certain exemplary embodiments, temperature sensors (376, FIG. 3) may be disposed in the first chamber 247, the second chamber 249, or both the first and second chambers. Exemplary temperature sensors include thermocouples.

Referring again to FIG. 1, the process air outlet conduits 160*a*, 160*b* and reheated air inlet conduits 165*a*, 165*b* comprise ducts, blowers, piping, plenums, and venting conduits. Used, process air 123 from the dryer 115 exits the dryer 115 through the process air outlet conduits 160*a*, 160*b*. A portion of the process air 123 flows through the process air outlet conduits 160*a*, 160*b* and into exhaust conduits 127. Only the exhaust conduit 127 for the wet end 111 of the dryer 115 is shown in FIG. 1 to better illustrate the remaining structure of the process air recirculation system 120. The exhaust conduits 127 may convey the process air 123 through one or more heat recovery units before depositing the process air in the exhaust outlet 131. From the exhaust outlet 131, commonly a stack, the process air 123 exits the manufacturing plant and diffuses as a plume into the atmosphere. The exhaust outlet 131 and exhaust conduits 127 prevent excess pressure build up within the process air recirculation system 120 by allowing excess process air 123 to exit the process air recirculation system 120.

The portion of the process air 123, 223 that does not exit through the exhaust conduits 127 flows instead into the electric heater mixing plenum 150, 250. The first inlet damper 261 is configured to have an open position and a closed position. Likewise, the second inlet damper 263 is configured to have open position and a closed position. By selectively opening and closing the first inlet damper 261 and the second inlet damper 263, operators can control the amount of process air 123, 223 flowing into the first chamber 247 and the second chamber 249. In this manner, the operators can control the amount of process air 123, 223 that contacts the resistance electric heater 270 in the first chamber 247. In the depicted embodiment, the second chamber 249, also known as the by-pass chamber, lacks an electric heater. A mixing chamber 255 is disposed downstream of both the first chamber 247 and the second chamber 249. The electrically heated air 224 exiting the first chamber 247 mixes with the process air 223 that passed through the bypass chamber 249 in the mixing chamber 255 to produce a reheated air 225. The reheated air 225 then flows into the reheated air inlet conduit 265 on a return path toward the dryer 115.

A blower 173, commonly a circulating fan, is disposed downstream of the electric heater mixing plenum 150, 250. The fan itself is typically created from an alloy, commonly weathered, corrosion-resistant steel such as A242, A588, A606, A606-4, and ASTM A847, that is selected for its ability to function at high temperatures. Most blowers of this type have a temperature ceiling of 752° F. (about 400° C.). Above this temperature ceiling the weathered, corrosion-resistant steel begins to melt and corrode.

By selectively controlling the dampers (261, 251, 263, 253), operators can adjust the temperature of the reheated air 255 to protect the blower 173 disposed downstream of the electric heater mixing plenum 150, 250.

It will be appreciated that certain exemplary embodiments comprise multiple electric heaters 270 in the first chamber 247 of the electric heater mixing plenum 150, 250. In other exemplary embodiments, both the first chamber 247 and the second chamber 249 comprise an electric heater 270. In still other exemplary embodiments, the electric heater mixing plenum 150, 250 comprises more than two chambers.

The electric heater 270 can be a resistance type electric heater through which an electric current moves through a resistance element, such as a wire or ribbon. The resistance element, having high electric resistance, converts a portion of the current into heat, which diffuses from the resistance element. Resistance-type electric heaters present unique challenges to process air recirculation systems used in the pulp, paper, cardstock, tissue, and non-woven fabrics industries. The process air from the dryer is typically quite humid an contains flammable particles from the process (e.g., pulp or fabric particles, commonly derived from lignocellulosic sources). The humidity of the process air can cause pulp to accumulate within the recirculation system, particularly in areas of poor air flow. Resistance-type electric heaters 270 such as the ones disclosed herein typically output heat above the combustion temperature of the pulp.

To reduce the potential for fire, and to reduce pressure drops, the exemplary electric heaters 270 disclosed herein are preferably disposed on one or more walls 245 of the chambers 247, 249 such that the heating side of the heating element is generally parallel to the aggregate flow of process air 123, 223 within the chambers 247, 249. In this manner, the electric heaters 270 radiate heat toward a passing stream of process air 123, 223. While the electric heating elements could be placed directly in the path of the process air, (e.g. such that the heating side of the heating element is generally perpendicular to the aggregate flow of process air 123, 223) it is contemplated that forcing all process air 123, 223 through the electric heating elements 270 would create a pressure drop of up to 15% compared to the preferred design and increase the likelihood of pulp accumulation on the heating side of the heating element 270, thereby increasing the risk of fire. The heating side may also comprise shielding for the resistance heating elements, such as metal plates, that obstruct the heating elements themselves from much of the particles in the process air 123, 223 while still conducting the heat to warm the process air 123, 223.

In the embodiment depicted in FIG. 1, a blower 173, commonly in the form of a fan and a motor, sucks the reheated air from the electric heater mixing plenum 150, 250 through the reheated air inlet conduit 165, 265 on a return path toward the dryer 115. Makeup air 137 enters the system through a makeup air chamber 133. Makeup air conduits 129 fluidly communicate with the makeup air chamber 133 and the reheated air inlet conduit 165, 265 to regulate the pressure of the process air in the system. The blower 173 then conveys the reheated air 125, 225 through a combustion system 183. The combustion system typically comprises a supplemental air blower 171 that supplies sufficient air to maintain combustion. This supplemental combustion air 177 is supplied via supplemental combustion air conduits 191 to the supplemental air blowers 171. In the depicted embodiment, control systems 193 permit operators to monitor and regulate the process air recirculation systems for the dry end 113 and wet end 111, respectively.

In the depicted embodiment, the combustion system 183 is powered by natural gas or other fossil fuel. In other exemplary embodiments, the combustion system 183 is absent. The combustion system 183 further heats the electrically reheated air 125 to produce a desirably reheated air 175 and conveys the desirably reheated air 175 back into the dryer 115 to dry the web 105 and to repeat the process.

An advantage of having both a combustion system 183 and an electric heater 270 disposed in an electric heater mixing plenum 150, 250 is that the fossil fuel input to the combustion system 183 can be significantly reduced over conventional systems because of the reliance on the electric heater 270. In certain exemplary embodiments, the combustion system 183 is absent and the process air 123 is reheated entirely by electric heaters 270. However, in embodiments that have a combustion system 183 and an electric heater mixing plenum 150, 250, operators can increase fuel input into the combustion system 183 if one or more of the electric heaters 270 fail, while closing the first inlet damper 261 and the first outlet damper 251 to isolate the first chamber 247 from air flow to thereby permit maintenance personnel to repair or replace the malfunctioning electric heater 270 safely. Operators can also open the second inlet damper 263 and the second outlet damper 253 to maintain the flow of process air 123, 223 through the second chamber 249. In this situation, the process air 123, 223 then flows through the combustion system 183 for reheating. In this manner, the disclosed embodiment permits the continuation of the reheating process and therefore the continuation of the overall production process while repairs are made. Furthermore, in embodiments that comprise multiple electric heaters 270 in two or more chambers, production is not compromised if one heating element fails because the malfunctioning heating element can be isolated and repaired while the flow of process air is redirected to a chamber with functioning heating elements.

It will be understood that the flow rates, temperatures, and other specifications of particular embodiments will vary depending upon the throughput capacity of a particular system. In one exemplary embodiment comprising a combustor 183, process air 123, 223 enters the upstream end 242 of the electric heater mixing plenum 150, 250 at mass flow rate of about 344 kilograms per minute ("kg/min") or a volumetric flow rate of about 24 cubic meters per second ("$m^3/s$"). The temperature of the process air 123, 223 is about 676.4° F. (about 358° C.). The resistance type electric heater 270 disposed in the first chamber 247 can have an energy output of 600 kilowatts ("KW"). The electric heater 270 heats the process air to about 860° F. (about 460° C.) to define the electrically heated air 224. The electrically heated air 224 continues to flow downstream at a mass flow rate of about 172 kg/min, but the volumetric flow rate increases to about 13.3 $m^3/s$ to reflect an increased pressure and speed due to increased temperature. Meanwhile, the comparatively cooler process air 123, 223 that flows through the bypass chamber 249 continues to flow at an amount of about 172 kg/min and a temperature of about 676.4° F. The two streams then mix in the mixing chamber 255 to reach an average temperature of about 761° F. (about 405° C.) to define a reheated air 225. With the combined streams, the reheated air 225 exits the electric heater mixing plenum 150, 250 at a mass flow rate increases to about 344 kg/min and the volumetric flow rate increases to about 26 $m^3/s$.

A blower 173 then facilitates the movement of the reheated air 225 reheated air 225 to the combustor 183. The combustor 183 may have an independent vent blower configured to supply sufficient supplementary air sufficient to maintain combustion. A typical combustor 183 may have a power output in the range of about 1,500 KW to about 1,800 KW. The combustor 183 heats the reheated air 225 to a desirable temperature before redirecting the desirably reheated air 175 back into the dryer 115. In this example, the desirably reheated air 175 has an average temperature of about 878° F. (about 470° C.).

Figure 3:
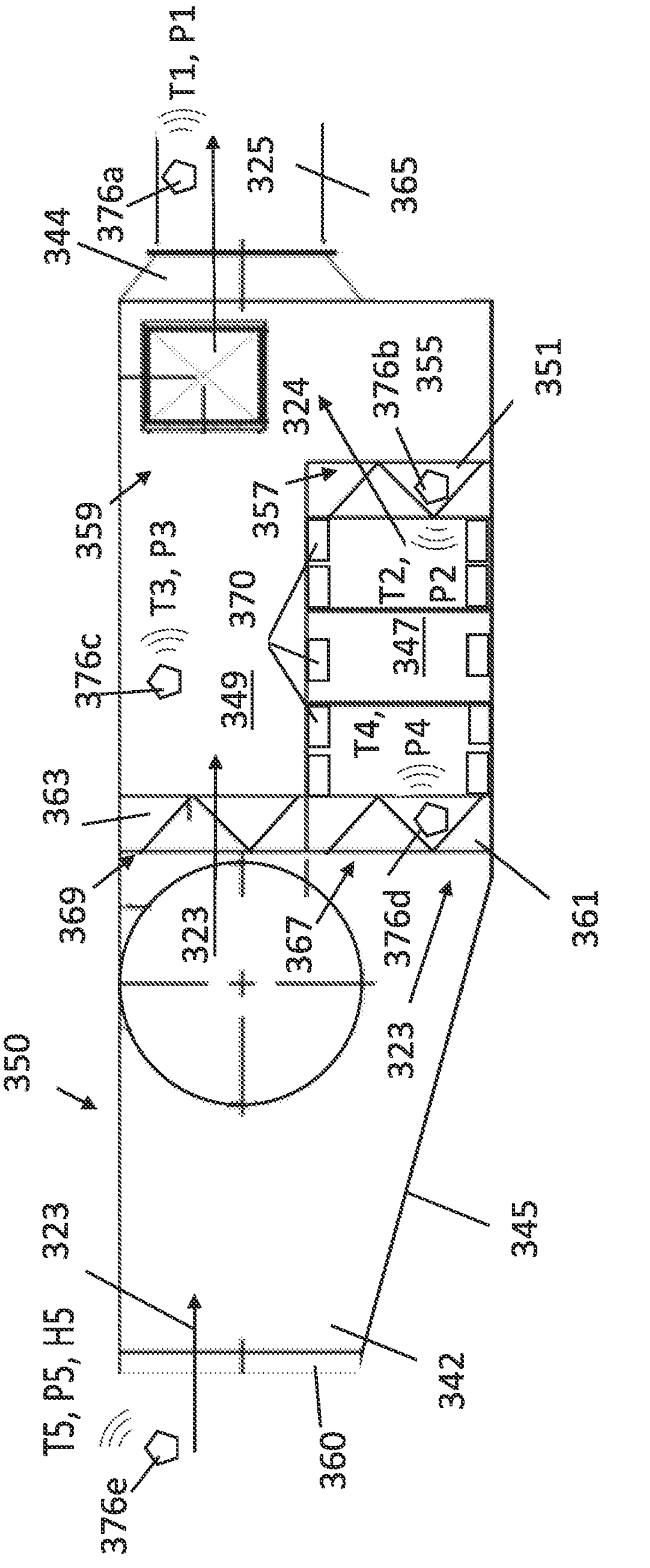
FIG. 3 is a top-down cross-sectional and schematic view of an exemplary temperature and pressure regulation system.

FIG. 3 depicts a system having a process air outlet conduit 360, a reheated air inlet conduit 365, an electric heater mixing plenum 350 having: an upstream end 342 configured to fluidly communicate with the process air outlet conduit 360, a downstream end 344 configured to fluidly communicate with a reheated air inlet conduit 365. The downstream end 344 is distally disposed from the upstream end 342. Walls 345 define a first chamber 347 having a first upstream opening 367 and a first downstream opening 357. Walls 345 can further define a second chamber 349 having a second upstream opening 369 and a second downstream opening 359. A first inlet damper 361 is disposed at the first upstream opening 367. A second inlet damper 363 is disposed at the second upstream opening 369. A resistance-type electric air heater 370 is disposed in the first chamber 347, and a first sensor 376*a* is disposed in a reheated air inlet conduit 365. A second sensor 376*b* is disposed proximate the first downstream opening 357, a third sensor 376*c* disposed in the second chamber 349, and a fourth sensor 376*d* disposed proximate to the first upstream opening 367. Each of the first sensor 376*a*, second sensor 376*b*, third sensor 376*c*, and fourth sensor 376*d* is configured to measure a temperature or pressure of a process air 323 passing any of the first sensor 376*a*, second sensor 376*b*, third sensor 376*c*, or fourth sensor 376*d* to define a first, second, third, or fourth sensor measurement. It will be understood that the sensor measurement is a temperature measurement (e.g. T1 for the first sensor 376*a*, T2 for the second sensor 376*b*, T3 for the third sensor 376*c*, T4 for the fourth sensor 376*d*, etc.) when the sensor 376 is configured to measure temperature. Likewise, it will be understood that the sensor measurement is a pressure measurement (e.g., P1 for the first sensor 376*a*, P2 for the second sensor 376*b*, P3 for the thirds sensor 376*c*, P4 for the fourth sensor 376*d*, etc.) when the sensor 376 is configured to measure pressure.

When the sensor 376 is selected to measure temperature, the sensor 376 can be a thermocouple. A thermocouple comprises two different electrical conductors having different innate electrical resistance properties. These two different conductors are arranged to form an electrical junction. When there is a temperature difference between the two conductive metals, a magnetic field is generated. This magnetic field likewise generates a temperature-dependent voltage because of this thermoelectric effect. This voltage can then be measured relative to a reference value to obtain the measurement value (e.g., T1) of the temperature. Because temperature and pressure and innately linked for gaseous fluids in a closed system (e.g., at a defined volume), the thermocouple can also be used to calculate the pressure (e.g., P1) of the process air 323 at the location of the sensor. In this manner, the sensors 376*a*, 376*b*, 376*c*, 376*d* are configured to measure a temperature and/or a pressure of a process air 323 as the process air 323 passes over the sensing end of the sensors.

Although thermocouples may be desirable for their efficacy and cost, all sensors that are configured to measure temperature, pressure, or humidity are within the scope of this disclosure. Other common temperature sensors include: high temperature limit thermocouples and process temperature thermocouples. Other common pressure sensors include static pressure sensors.

Each sensor 376*a*, 376*b*, 376*c*, 376*d* is configured to transmit the sensor measurement to a controller (see 193, FIG. 1). The sensor measurement may be transmitted as an electronic signal via wires, or as electromagnetic radiation wirelessly. In this manner, each sensor is configured to transmit the sensor measurement to the controller. The controller may be a programmable logic controller ("PLC"), distributed control system ("DCS"), a proportional-integral-derivative ("PID") controller, or other digital or analog computer capable of controlling the exemplary process air recirculation system 120 based on inputs from the sensors 376.

An exemplary system may further comprise a fifth sensor 376*e* disposed in the process air outlet conduit 360. In other exemplary embodiments, the fifth sensor 376*e* can be disposed elsewhere provided that the fifth sensor 376*e* is upstream of the electric heater mixing plenum 350 and provided that the fifth sensor is configured to measure properties of the process air 323 before the process air reaches the electric heater mixing plenum 350. The fifth sensor 376*e* can likewise be configured to measure a temperature or pressure of a process air 323 passing the fifth sensor 376*e* to define a fifth sensor measurement T5, P5 and wherein the fifth sensor 376*e* is configured to transmit the fifth sensor measurement T5, P5 to the controller 193. In certain exemplary embodiments, the fifth sensor can be configured to measure a humidity of the process air 323 passing the fifth sensor 376*e* to define a fifth sensor measurement 115, wherein 115 is a humidity measurement.

Common humidity sensors include hygrometers. The water saturation level of the process air 323 (i.e., the humidity level) has a significant impact on the exemplary system's energy consumption. The process air is typically humid because of the drying application. That is, as the dryer (see 115) dries the wet web 105*a*, with the desirably reheated air 175, water from the wet web atomizes and mixes with the drying air as recaptured in by the drier 115 to become process air 123, 223, 323, per the parlance of this disclosure. The water saturated air, i.e., the process air 323 is heated up as the process air moves through the exemplary process air recirculation system 120.

The saturated air entropy increases when the air is more saturated with water vapor; that is, the entropy of air is high when saturation is high. Therefore, the higher the humidity of the process air 323, the less energy the electric heater 370 and the combustion system 183 (if present) will need to expend to reheat the process air 323 to the temperature of the desirably reheated air 175. Based on humidity measurement 115, the controller 193 can adjust the volume of the process air 323 that goes through the electric heater 370. The controller 193 can achieve this by selectively opening and closing the first inlet damper 361 and the second inlet damper 363 to reach the desired volume of airflow through the first chamber 347 and the second chamber 349. When the air volume is larger, the water saturation of the air is lower. The controller's objective is generally to achieve high water saturation level with a minimum volume.

It will be appreciated that in other exemplary embodiments, the sensors 376 can measure other properties of the process air 323 such as flow rate and energy input. Sensors can also be disposed at other locations within the exemplary process air recirculation system 120.

As FIG. 3 illustrates, the first sensor 376*a* disposed proximate to the reheated air inlet conduit 365, measures the temperature and pressure of the reheated process air 325 as the reheated process air 325 exits the electric heater mixing plenum 350. The second sensor 376*b* measures the temperature and pressure of the electrically heated process air 324 near the first downstream opening 357. The third sensor 376*c* measures the temperature and pressure of the process air 323 traversing the second chamber 349. The fourth sensor 376*d* measures the temperature and pressure of the portion of the process air 323 that enters the first chamber 347 through the first upstream opening 367. In embodiments comprising a fifth sensor 376*e*, the fifth sensor 376*e* measures the temperature and pressure of the process air 323 as the process air 323 enters the electric heater mixing plenum 350.

By measuring the temperature and pressure values of the process air 323, electrically heated air 324, and reheated air 325 at the indicated locations, the controller 193 can compare the sensed temperature and pressure with the desired temperature and pressure and open and close the first inlet damper 361, second inlet damper 363, and first outlet damper 351 accordingly until the temperature and pressure of the reheated air 325 exiting the electric heater mixing plenum 350 is within acceptable variances from the desired temperature and pressure.

The controller 193 can also be programmed to track the fossil fuel and the electrical energy consumption. The controller 193 can further be programmed to track the mill's cost of each energy source. With these data, the controller 193 can then compute the desired levels of fossil fuel and electrical energy input to maximize production efficiency based on the energy cost of production.

In embodiments that lack a combustion system 183, the controller 193 can be used to track and adjust the electrical energy input of multiple electric heaters 370 to achieve the desired temperature and pressure of the reheated process air 325, while also minimally taxing each individual electric heater 380 to increase the longevity of the individual units. The disclosed sensors 376 can further include failsafe sensors, or the controller 193 can be programmed to execute failsafe measures if measurements from the sensors 376 exceed or fall below certain levels.

An exemplary process air recirculation system can comprise: a dryer; and an electric heater mixing plenum having: an upstream end configured to fluidly communicate with a process air outlet conduit, wherein the process air outlet conduit is configured to fluidly communicate with a dryer, a downstream end configured to fluidly communicate with a reheated air inlet conduit, wherein the reheated air inlet conduit is configured to fluidly communicate with the dryer, walls defining a first chamber having a first upstream opening and a first downstream opening, and a second chamber having a second upstream opening and a second downstream opening, wherein the second chamber is adjacently disposed to the first chamber, a first inlet damper disposed at the first upstream opening, a second inlet damper disposed at the second upstream opening, and a resistance-type electric air heater disposed in the first chamber.

An exemplary process air recirculation system of can further comprise a combustion heating system configured to fluidly communicate with the electric heater mixing plenum, wherein the combustion heating system is disposed downstream of the electric heater mixing plenum, and wherein the combustion heating system is disposed upstream of the dryer, thereby completing a circuit.

An exemplary embodiment of the exemplary process air recirculation system can have an electric heater mixing plenum that further comprises a resistance-type electric air heater disposed in the second chamber. Such an exemplary embodiment may still further comprise multiple resistance-type electric air heaters disposed in the second chamber.

An exemplary embodiment of the exemplary process air recirculation system can further comprise multiple resistance-type electric air heaters disposed in the first chamber.

An exemplary embodiment of the exemplary process air recirculation system can further comprise sensors disposed in the electric heater mixing plenum, wherein the sensors are configured to measure a process air temperature and pressure. In one such exemplary embodiment, the sensors can be thermocouples.

An exemplary embodiment of the exemplary process air recirculation system can further comprise sensors configured to measure a temperature or pressure of process air passing the sensors to define a measurement, and wherein the sensors are configured to transmit the measurement to a controller.

An exemplary system can comprise: a dryer; an exhaust outlet disposed downstream from the dryer, wherein the dryer fluidly communicates with the exhaust outlet; a makeup air inlet disposed downstream from the dryer, wherein the makeup air inlet fluidly communicates with the dryer; an electric heater mixing plenum configured to fluidly communicate with the air makeup inlet, wherein the electric heater mixing plenum is disposed downstream of the air makeup inlet; a combustion heating system configured to fluidly communicate with the electric heater mixing plenum, wherein the combustion heating system is disposed downstream of the electric heater mixing plenum, and wherein the combustion heating system is disposed upstream of the dryer, thereby completing a circuit.

In an exemplary embodiment of the exemplary process air recirculation system, the electric heater mixing plenum comprises: walls defining a first chamber having a first upstream opening and a first downstream opening, and a second chamber having a second upstream opening and a second downstream opening, wherein the second chamber is adjacently disposed to the first chamber; a first inlet damper disposed at the first upstream opening; a second inlet damper disposed at the second upstream opening; and a resistance-type electric air heater disposed in the first chamber. In yet another exemplary embodiment of the exemplary process air recirculation system, the electric heater mixing plenum further comprises a first outlet damper disposed at the first downstream opening, and a second outlet damper disposed at the second downstream opening.

An exemplary embodiment of the exemplary process air recirculation system can further comprise a blower configured to move a process air through the system.

An exemplary embodiment of the exemplary process air recirculation system can further comprise an exhaust blower configured to move a process air through the exhaust outlet An exemplary embodiment of the exemplary process air recirculation system can further comprise a makeup blower configured to introduce a makeup air through the makeup air inlet.

An exemplary embodiment of the exemplary process air recirculation system can have an electric heater mixing plenum that further comprises a resistance-type electric air heater disposed in the second chamber.

An system can comprise: a process air outlet conduit; a reheated air inlet conduit; an electric heater mixing plenum having: an upstream end configured to fluidly communicate with the process air outlet conduit, a downstream end configured to fluidly communicate with a reheated air inlet conduit, wherein the downstream end is distally disposed from the upstream end, walls defining a first chamber having a first upstream opening and a first downstream opening, and a second chamber having a second upstream opening and a second downstream opening, a first inlet damper disposed at the first upstream opening, a second inlet damper disposed at the second upstream opening, a resistance-type electric air heater disposed in the first chamber; and a first sensor disposed in the reheated air inlet conduit; a second sensor disposed proximate the first downstream opening; a third sensor disposed in the second chamber; and a fourth sensor disposed proximate to first upstream opening, wherein each of the first sensor, second sensor, third sensor, and fourth sensor is configured to measure a temperature or a pressure of a process air passing any of the first sensor, second sensor, third sensor, or fourth sensor to define a first, second, third, or fourth sensor measurement, and wherein each of the first sensor, second sensor, third sensor, or fourth sensor is configured to transmit the respective sensor measurement to a controller.

An exemplary embodiment of the system can further comprise a fifth sensor disposed in the process air outlet conduit, wherein the fifth sensor is configured to measure a temperature or pressure of the process air passing the fifth sensor to define a fifth sensor measurement, and wherein the fifth sensor is configured to transmit the fifth sensor measurement to the controller.

In an exemplary embodiment of the system, the fifth sensor is further configured to measure a humidity level of the process air passing the fifth sensor to define a humidity measurement, and wherein the fifth sensor is configured to transmits the humidity measurement to the controller.

The foregoing detailed description of the preferred embodiments is presented only for illustrative and descriptive purposes and is not intended to be exhaustive or to limit the scope and spirit of the invention. The embodiments were selected and described to best explain the principles of the invention and its practical applications. One of ordinary skill in the art will recognize that many variations can be made to the invention disclosed in this specification without departing from the scope and spirit of the invention.

It is to be understood that the present invention is by no means limited to the particular constructions and method steps herein disclosed or shown in the drawings, but also comprises any modifications or equivalents within the scope of the claims known in the art. It will be appreciated by those skilled in the art that the devices and methods herein disclosed will find utility.

What is claimed is:

1. A method of controlling air flow through an electric heater mixing plenum, wherein the electric heater mixing plenum includes an upstream end, a downstream end, a first chamber, a second chamber adjacently disposed to the first chamber, and a mixing chamber located at the downstream end of the electric heater mixing plenum, comprising:

controlling a first inlet damper and a first outlet damper of a first chamber of the electric heater mixing plenum to open positions to allow air flow through the first chamber, wherein the first chamber includes a resistance-type electric air heater;

controlling a second inlet damper of a second chamber of the electric heater mixing plenum to an open position to allow air flow through the second chamber;

monitoring a property of process air as it exits the mixing chamber of the electric heater mixing plenum;

adjusting the open position of the first inlet damper based on the monitored property; and adjusting the open position of the second inlet damper based on the monitored property.

2. The method of claim 1, further comprising:

monitoring a temperature of electrically reheated air from the first chamber:

monitoring a temperature of process air in the second chamber; and adjusting at least one of the open position of the first inlet damper or the open position of the second inlet damper based on the monitored temperatures.

3. The method of claim 1, wherein the property of process air is temperature or pressure.

4. The method of claim 1, further comprising:

monitoring humidity of process air at an upstream end of the electric heater mixing plenum; and adjusting the open position of the first inlet damper based on the monitored humidity.

5. The method of claim 1, further comprising:

closing the first inlet damper and the first outlet damper to prevent air flow through the first chamber; and adjusting the open position of the second inlet damper.

6. The method of claim 5, further comprising shutting down the resistance-type electric air heater.

7. A method for controlling an electric heater mixing plenum used in an air recirculation system, comprising:

controlling a first inlet damper and a first outlet damper of a first chamber of the electric heater mixing plenum to open positions to allow air flow through the first chamber, wherein the first chamber includes a resistance-type electric air heater;

controlling a second inlet damper of a second chamber of the electric heater mixing plenum to an open position to allow air flow through the second chamber, wherein the second chamber is adjacently disposed to the first chamber within the electric heater mixing plenum; and closing the first inlet damper and the first outlet damper of the first chamber to prevent air flow through the first chamber, wherein when the first inlet damper and the first outlet damper are in closed positions and the second inlet damper is in the open position, air flow through the electric heater mixing plenum flows from an upstream end of the electric heater mixing plenum through the second inlet damper into the second chamber, through the second chamber into a mixing chamber, and through the mixing chamber to a downstream end of the electric heater mixing plenum, and when the first inlet damper and the first outlet damper are in open positions and the second inlet damper is in a closed position, air flow through the electric heater mixing plenum flows from the upstream end of the electric heater mixing plenum through the first inlet damper into the first chamber, through the first outlet damper into the mixing chamber, and through the mixing chamber to the downstream end of the electric heater mixing plenum.

8. The method of claim 7, wherein when the first inlet damper, the first outlet damper, and the second inlet damper are in open positions, air flow through the electric heater mixing plenum flows from the upstream end of the electric heater mixing plenum through the first inlet damper into the first chamber and through the second inlet damper into the second chamber, through the first chamber and first outlet damper and the second chamber into the mixing chamber, and through the mixing chamber to the downstream end of the electric heater mixing plenum.

9. The method of claim 8, wherein the first inlet damper, the first outlet damper, and the second inlet damper are in open positions, further comprising:

receiving data regarding electric energy costs and fossil fuel costs; and based on the electric energy costs and the fossil fuel costs:

modifying the open position of the first inlet damper; and modifying the open position of the second inlet damper.

10. The method of claim 7, wherein closing the first inlet damper and the first outlet damper of the first chamber to prevent air flow through the first chamber is based on a shutdown of the resistance-type electric air heater disposed in the first chamber of the electric heater mixing plenum.

11. The method of claim 10, further comprising increasing fossil fuel input into a combustion system based on the shutdown of the resistance-type electric air heater.

12. The method of claim 10, further comprising:

controlling the first inlet damper and the first outlet damper to open positions and restarting the resistance-type electric air heater.

13. The method of claim 7, further comprising:

controlling a third inlet damper of a third chamber of the electric heater mixing plenum to an open position to allow air flow through the third chamber, wherein the third chamber includes a second resistance-type electric air heater.

14. A method for controlling an electric heater mixing plenum used in a drying system, comprising:

controlling a first inlet damper and a first outlet damper of a first chamber of the electric heater mixing plenum to open positions to allow air flow through the first chamber into a mixing chamber of the electric heater mixing plenum, wherein the first chamber includes a resistance-type electric air heater;

controlling a second inlet damper of a second chamber of the electric heater mixing plenum to an open position to allow air flow through the second chamber into the mixing chamber, wherein the second chamber is adjacently disposed to the first chamber within the electric heater mixing plenum;

monitoring a temperature of process air at an upstream end of the electric heater mixing plenum, a temperature of electrically reheated air from the first chamber, and a temperature of reheated air from the mixing chamber; and comparing the monitored temperatures to preselected temperatures; and based on the comparison, controlling the positions of the first inlet damper, and the second inlet damper to adjust air flow through the first chamber and the second chamber, wherein the first inlet damper and the second inlet damper are positioned at the upstream end of the electric heater mixing plenum and the mixing chamber is positioned at a downstream end of the electric heater mixing plenum.

15. The method of claim 14, further comprising:

receiving data regarding electric energy costs and fossil fuel costs; and based on the electric energy costs and the fossil fuel costs:

modifying the position of the first inlet damper; and modifying the position of the second inlet damper.

16. The method of claim 14, wherein controlling the positions of the first inlet damper and the second inlet damper to adjust air flow through the first chamber and the second chamber, comprises:

closing the first inlet damper and the first outlet damper of the first chamber to prevent air flow through the first chamber; and modifying the open position of the second inlet damper.

17. The method of claim 16 further comprising increasing fossil fuel input into a combustion system based on closing the first inlet damper and the first outlet damper.

18. The method of claim 14, further comprising:

controlling a third inlet damper of a third chamber of the electric heater mixing plenum to open positions to allow air flow through the third chamber, wherein the third chamber includes a second resistance-type electric air heater.

19. The method of claim 14, further comprising:

measuring humidity of process air at the upstream end of the electric heater mixing plenum; and based on the measured humidity, adjusting the first inlet damper to adjust a volume of process air through the first chamber.

* * * * *